United States Patent Office 3,564,530
Patented Feb. 16, 1971

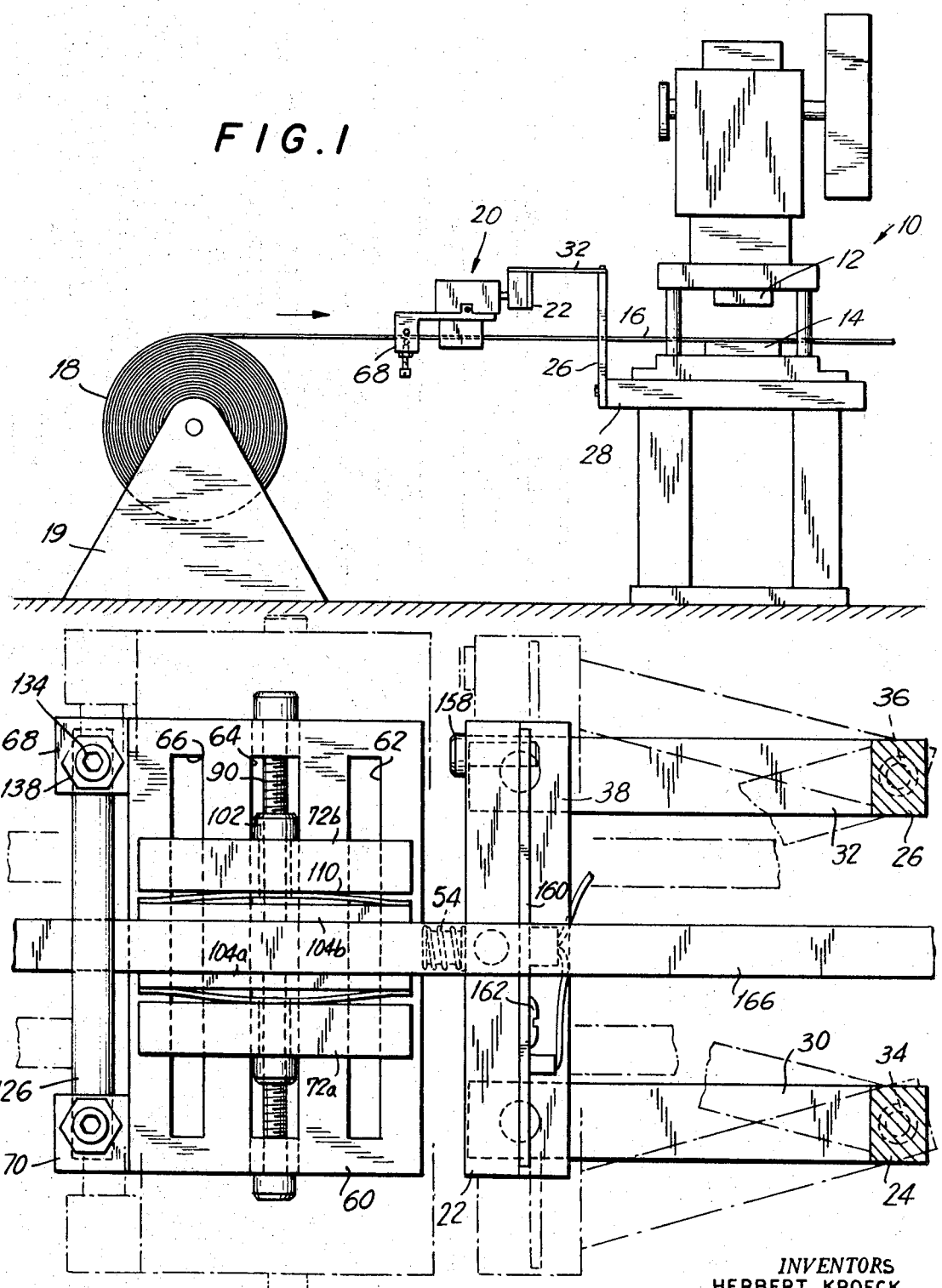

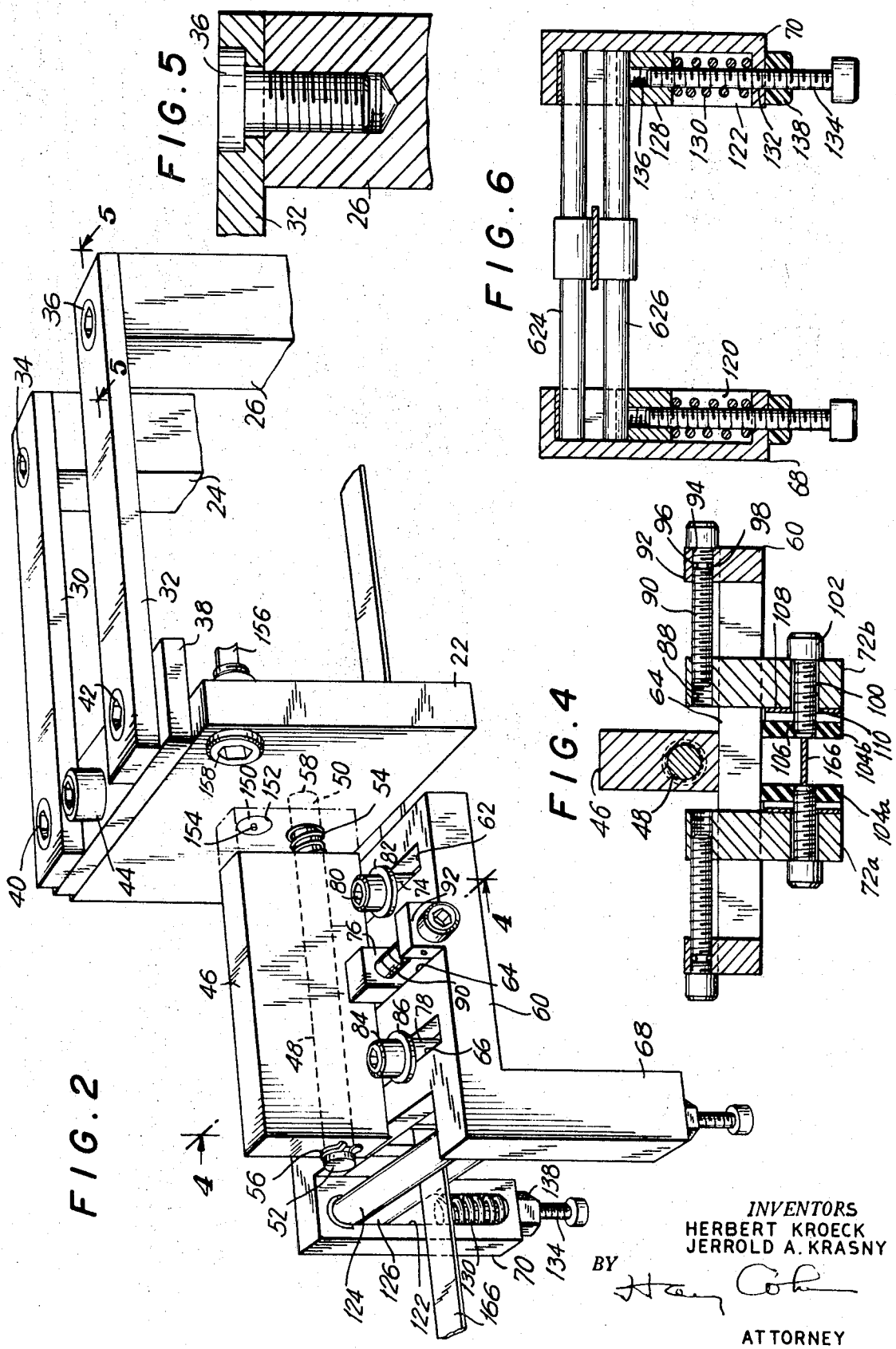

3,564,530
MATERIAL MONITORING SYSTEM
Herbert Kroeck, Central Islip, and Jerrold A. Krasny,
New York, N.Y., assignors to Weldotron Corporation,
Newark, N.J., a corporation of New Jersey
Filed May 22, 1968, Ser. No. 731,179
Int. Cl. G08b 21/00
U.S. Cl. 340—259                              8 Claims

ABSTRACT OF THE DISCLOSURE

An apparatus for monitoring the thickness and width of a strip of material includes a pair of calipering rollers for monitoring the thickness and a pair of calipering plates for monitoring the width of the strip, all mounted on the block, and adapted to bind onto an oversize moving strip to move the block and thereby generate a stop signal.

BACKGROUND OF THE INVENTION

(1) Field of the invention

The invention relates to systems for monitoring the dimensions of a web; and especially to a system for monitoring a continuous strip which is being fed to a stamping press.

(2) Prior art

Machinery employing sheets, strips, and/or rolls of material often require that such material be of uniform dimension as to thickness, width and/or straightness. Material which is too thick or has edges which are burred or curled, or is excessively wide, or which is skewed, may result in damage to the machinery. In the case of metal stamping presses, it may result in smashed punches and dies. While systems are known for monitoring parts stuck in the die, such as is shown in U.S. Pat. No. 3,184,725 issued to M. Siegel at al. on May 18, 1965, none are available for monitoring dimensional deviations in the material immediately before use. Such undetected deviations are a major cause in many smashups and related machinery damage.

SUMMARY OF THE INVENTION

It is an object of the invention to provide a system for detecting dimensional deviations in excess of a preset tolerance in a strip of material as it is being fed to utilization equipment, and for providing a signal in response to such a deviation. This signal may be utilized to halt the feed and the utilization equipment.

A feature of this invention is the provision of a system having first means for continuously calipering the absolute thickness of a strip of moving material; second means for continously calipering the absolute width of a preset length of said strip; and signal providing means coupled to said first and second means for providing a signal in response to either of said first or second means detecting a deviation in dimension greater than a preset tolerance.

BRIEF DESCRIPTION OF THE DRAWING

These and other objects, features and advantages of the invention will be apparent from the following specification taken in conjunction with the accompanying drawing in which:

FIG. 1 is a view in elevation of a stamping press, a supply roll and a dimension monitoring system embodying this invention;

FIG. 2 is a perspective view of the dimension monitoring system of FIG. 1;

FIG. 3 is a bottom plan view of the system of FIG. 1;

FIGS. 4, 5 and 6 are views in cross-section taken along planes 4—4, 5—5 and 6—6, respectively of FIG. 2.

DESCRIPTION OF THE PREFERRED EMBODIMENT

As shown in FIG. 1, a conventional stamping press 10 having a punch 12 and a die 14 receives a workpiece such as a continuous strip of metal 16 which is paid out from a supply roll 18 mounted on a suitable support 19. It is necessary to insure that workpiece does not exceed a predetermined dimension in absolute thickness, and does not exceed a predetermined dimension in absolute width over any predetermined length. Absolute thickness includes the thickness of the stock plus any burrs. Absolute width includes the width plus any skew over a predetermined length. For this purpose a monitoring system 20 is disposed between the supply roll and the stamping press.

The monitoring system 20 includes a main plate 22 which supports the calipering devices and which itself is suitably supported by linkage, as from the stamping press table. Two upright posts 24 and 26 are fixed to the table 28. Two horizontal links 30 and 32 are pivotally mounted to the upper ends of the posts, respectively, as by recessed machine screws 34 and 36. A horizontal link 38 is pivotally mounted to and between the two links 30 and 32, as by recessed machine screws 40 and 42. The main plate 22 is pivotally mounted to the link 38, as by a machine screw 44.

A hammer block 46 has a longitudinal bore 48 therethrough. The main plate 22 has a bore 50 therethrough. A rod 52 is disposed through the bores 48 and 50. A helical compression spring 54 is disposed on the rod between the hammer block and the main plate. The block 46 is free to pivot and slide on the rod and is biased away from the plate 22 by the spring 54. Two C-springs 56 and 58 are respectively provided on each end of the rod to capture the assembly. An L-shaped plate 60 is fixed to the underside of the hammer block 46, as by machine screws, not shown. The plate 60 has three slots 62, 64 and 66 therethrough and two depending posts 68 and 70. A pair of blocks 72a and 72b are slidably mounted on the undersurface of the plate 60. Each block 72 has three upwardly projecting lugs 74, 76 and 78. The lug 74 extends upwardly into the slot 62 and has a vertical threaded bore to receive a clamping machine screw 80 and a washer 82. Similarly, the lug 78 extends upwardly into the slot 66 and has a vertical threaded bore to receive a clamping machine screw 84 and a washer 86. The lug 76 extends upwardly through the slot 64 and has a horizontal threaded bore 88 to receive an adjusting machine screw 90. An upwardly directed lug or boss 92 is also formed on the plate 60, and has a bore 94 which passes the screw 90. The lug 92 has a cross bore which receives a pin 96 which passes into a neck 98 in the screw 90, to capture the screw to the lug. Thus rotation of the screw 90 will advance or withdraw the block 72 towards or away from the longitudinal midline of the plate 60, while the screws 80 and 84 may be tightened to clamp the block at any selected position.

Each block 72 has a horizontal bore 100 which has a bushing which passes a machine screw 102. Adjacent each block is a calipering plate 104 having a horizontal threaded central bore 106 which receives the end of the screw 102. A bent leaf spring 108 having a central hole 110 which passes the screw 102 is disposed between and biases apart the plate 104 and the block 72.

The two posts 68 and 70 have respectively opposed blind slots 120 and 122 routed therein. The upper end of each slot may be rounded and receive a half sleeve of bearing material. Two calipering rollers 124 and 126 are disposed between the two posts and their ends extend into the slots. A follower block 128 is disposed in the slot of each post and is biased against the end of the roller 126 by a helical compression spring 130. The lower end of each post has a vertical bore 132 therethrough which passes a machine screw 134. Each follower block 128 has a vertical bore 136 therethrough which is threaded to receive the end of the respective screw 132. A locking nut 138 rides on the screw 132 and limits the expansion of the spring 130 while permitting free compression of the spring.

A dielectric plug 150 is fixed in a bore 152 through the main plate 22. The plug has a spring biased contact plunger 154 which projects forwardly from the plug towards the hammer block 46. The rear end of the contact is electrically connected to the contact 156 in a dielectric socket 158 fixed in the plate 22. A swing lever 160 is pivotally mounted to the rear of the main plate 22 by a machine screw 162.

In operation the strip of material 166 for the stamping press is passed from the supply roll 18, between the calipering rollers 124 and 126, between the calipering plates 104a and 104b, under the main plate 22, between the posts 24 and 26 to the stamping press 10. The screws 134 and their respective lock nuts 136 are adjusted so that the springs 130 bias the roller 126 towards the roller 124 to a spacing just equal to or slightly greater than the maximum allowable thickness of the strip 166. With this spacing, as a strip of allowable thickness passes therebetween, the rollers will turn freely; but when a strip of overthickness passes therebetween, the rollers will tend to bind on the strip, and as the strip advances towards the stamping press will be carried by the strip, together with the hammer block 46, against the bias of the spring 54. When the hammer block 46 touches the contact 154 it establishes an electrical path to ground for the contact 156. The connector 158 is adapted to be coupled to a suitable means for halting the stamping operation upon receipt of "ground" signal, such as is shown in U.S. Pat. No. 3,184,725, supra. The contact plunger 154 withdraws into the plug 150 under the pressure of the hammer block 46. When the hammer block 46 is halted by the main plate 22, if there is any continued movement of the strip, the springs 130 yield to permit the oversize strip to pass between the rollers without rupture.

The screws 90 are adjusted so that the springs 110 bias the calipering plates 104a and 104b to a spacing just equal to or slightly greater than the maximum allowable width of the strip 166. With this spacing, as the strip of allowable width passes therebetween, the strip will slide freely between the plates, but when a strip of overwidth passes therebetween, the plates will tend to bind on the strip, and as the strip advances towards the stamping press will be carried by the strip, together with the hammer block 46, against the bias of the spring 54, to establish an electrical path to ground through the contact 154 to the contact 156. When the hammer block 46 is halted by the main plate 22, if there is any continued movement of the strip, the springs 110 yield to permit the overwidth strip to pass between the plates without rupture.

The end of the lever 160 is of greater weight than the other end and normally rides on and is held up by the strip 166. In the absence of the strip, this end will swing down, about its pivot 162, and the other end will swing up, until it abuts the contact 156, thereby providing electrical continuity to ground.

It will be appreciated that the calipering rollers will tend to bind on a strip which is either too thick overall, or which has a burred edge of extra thickness. If a burred edge is acceptable, then modified rollers, such as shown in FIG. 6, may be utilized. These rollers 624 and 626 have reduced ends which will clear the burred edges of the strip and have full diameter middle portions for calipering the central portion of the strip.

It will also be appreciated that the calipering plates not only measure the width of any increment of length of the strip 166, but also measure the absolute width, including any skews, of any length of the strip equal to the length of the calipering plates.

The calipering rollers and plates are able to accommodate any variation in the path of movement of the strip by virtue of the several degrees of freedom of movement built into the system. The four pivot screws 34, 36, 40 and 42 provide a parallelogram swivel movement in the horizontal plane for the link 38. The plate 22 is free to rotate about the vertical axis of the pivot screw 44. The hammer block 46 is free to rotate about the horizontal axis of the rod 52.

While we have shown and described the presently preferred embodiment of our invention, it will be understood that the invention may be embodied otherwise than as herein specifically illustrated or described and is not to be limited to the herein described specific construction, except as may be required by the scope of the appended claims considered with reference to the prior art.

What is claimed is:

1. A system for monitoring a strip of material moving along a path, comprising: first means for continuously calipering the absolute thickness of the strip; second means for continuously calipering the absolute width of a preset length of the strip; and signal providing means coupled to said first and second means for providing a signal in response to either of said first or second means detecting a deviation in dimension greater than a preset tolerance, said signal producing means includes a base member mounted for movement; said first means includes a pair of spaced apart rollers passing the thickness of the strip therebetween and mounted to said base member; said second means includes a pair of spaced apart members passing the width of the strip therebetween and mounted to said base member; each of said first and second means being adapted to bind on an oversize portion of the strip and to be carried along by the moving strip, thereby moving said base member, such movement of said base member actuating the provision of said signal.

2. A system according to claim 1, wherein said signal producing means further includes a support member;
   said base member is mounted to and for movement along an axis towards said support member and is biased away from said support member;
   the movement of said base member against said bias a predetermined distance towards said support member actuating the provision of said signal.

3. A system according to claim 2 wherein said base member is free for rotation about said axis.

4. A system according to claim 3 wherein said support member is mounted for movement laterally of the path.

5. A system according to claim 2 wherein said base member includes a first contact means and said support member includes a second contact means, and movement of said base member towards said support member carries said first contact means to engage said second contact means to provide said signal.

6. A system according to claim 5 wherein
   the rollers of said first pair of rollers are adjustably biased towards each other to a preset separation, whereby the passage of a strip of an oversize thickness causes an initial binding of said rollers thereon with a concomitant movement of said base member and upon the engagement of said base member with said support member causes a subsequent release of said rollers against said bias.

7. A system according to claim 6 wherein
   said pair of second members comprises two spaced apart plates extending along the path and adjustably biased towards each other to a preset separation, whereby the passage of a strip of an oversize width causes an initial binding of said plates thereon with a concomitant movement of said base member, and upon the engagement of said base member with said support member causes a subsequent release of said plates against said bias.

8. A system according to claim 6 wherein said rollers have enlarged central portions adapted to ride on the central portion only of the strip.

References Cited

UNITED STATES PATENTS

| | | | |
|---|---|---|---|
| 2,431,099 | 11/1947 | Wiseman et al. | 340—265 |
| 2,515,787 | 7/1950 | Moe | 340—265X |
| 2,848,815 | 8/1958 | Scheu | 340—259UX |
| 2,896,196 | 7/1959 | Hartford et al. | 340—259 |
| 3,363,458 | 1/1968 | Scharf et al. | 340—259X |
| 3,371,331 | 2/1968 | Buckholz | 340—259 |

ALVIN H. WARING, Primary Examiner

P. PALAN, Assistant Examiner

U.S. Cl. X.R.

200—61.13